Figure 1:
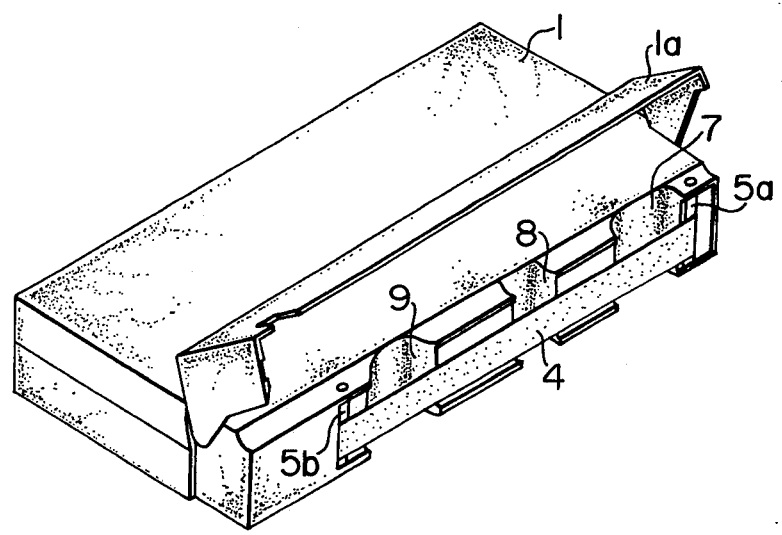

United States Patent [19]

Hayashi et al.

[11] 4,126,888
[45] Nov. 21, 1978

[54] MAGNETIC RECORDING AND REPRODUCING APPARATUS OF ROTATING HEAD TYPE

[75] Inventors: Yoshiaki Hayashi; Nobuyoshi Fujimori, both of Katano, Japan

[73] Assignee: Matsushita Electric Industrial Co., Ltd., Kadoma, Japan

[21] Appl. No.: 790,544

[22] Filed: Apr. 25, 1977

[30] Foreign Application Priority Data

May 4, 1976 [JP] Japan .................. 51-51025

[51] Int. Cl.² .......................................... G11B 15/66
[52] U.S. Cl. ......................................... 360/85; 360/95
[58] Field of Search .................. 360/85, 95, 132; 242/199, 200–202, 207, 208

[56] References Cited

U.S. PATENT DOCUMENTS 3,740,492   6/1973   Inaga ................................. 360/85
3,871,025   3/1975   Nakamoto ........................ 360/95 X

FOREIGN PATENT DOCUMENTS 20,674   4/1969   Japan ................................ 360/95

OTHER PUBLICATIONS

IBM Technical Disclosure Bulletin, vol. 13, No. 10, Mar. 1971, p. 3075.

Primary Examiner—John H. Wolff
Attorney, Agent, or Firm—Stevens, Davis, Miller & Mosher

[57] ABSTRACT

Disclosed is a magnetic recording and reproducing apparatus of the rotating head type in which a magnetic tape is drawn out from a tape cassette by means of tape lead-out pins and brought into close contact with a head cylinder containing rotating heads. Each of the tape lead-out pins is mounted on a slide member which is adapted to be driven by a drive means and slideably guided along a guide path consisting of a guide slot formed in a base plate of the apparatus. With such arrangement, the guide path need not coincide with the path of the driving means, whereby the tape loading mechanism and hence the apparatus as a whole can be small in size.

5 Claims, 20 Drawing Figures

FIG. 13
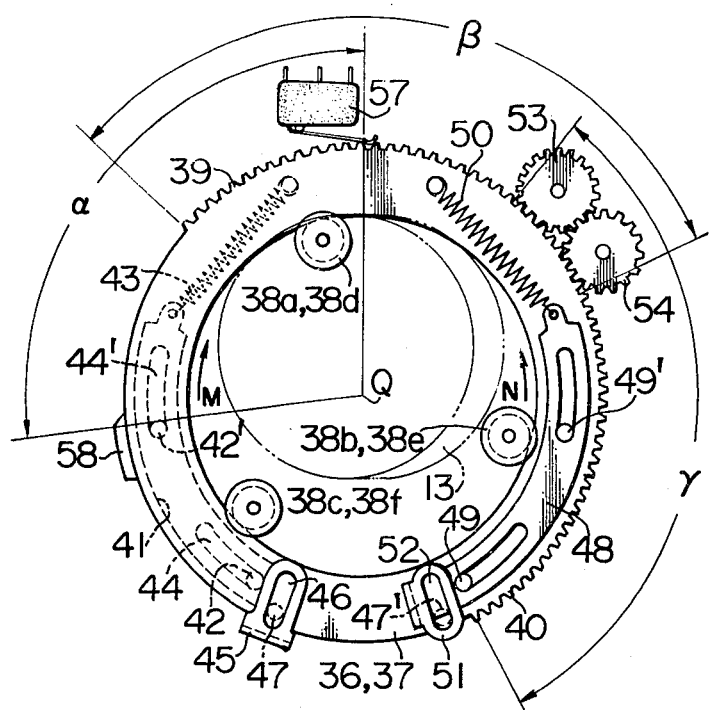
FIG. 14
FIG. 15
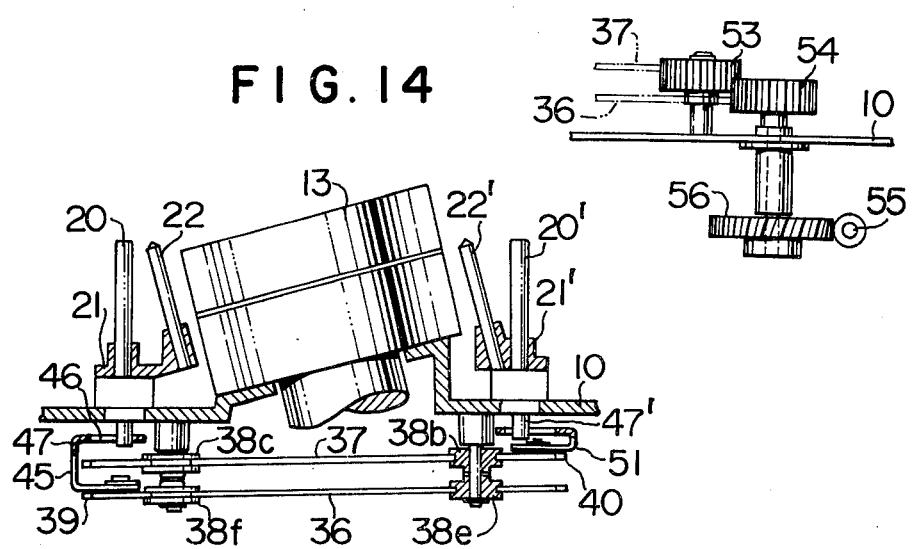

MAGNETIC RECORDING AND REPRODUCING APPARATUS OF ROTATING HEAD TYPE

The present invention relates in general to a magnetic recording and reproducing apparatus such as a video tape recorder (hereinafter referred to as VTR) of the helical scanning type in which a magnetic tape contained in a cassette is helically wound for a predetermined angle around a head cylinder accommodating therein a plurality of rotating heads, the recording and reproduction of signals being effected by the rotating heads. In particular, the invention relates to a structure of such VTR apparatus in which a magnetic tape is adapted to be automatically led out from a magnetic tape cassette housing accommodating therein a tape supply reel and a tape winding reel, and wound around the head cylinder over a predetermined angular distance.

In a VTR of the helical scanning type having $n$ rotating heads, a magnetic tape is wound around the head cylinder over a predetermined angular distance making for an angle slightly greater than $360°/n$, as known in the art. For example, in the case of the most conventional VTR having a head cylinder containing two rotating heads, it is required that the magnetic tape should be wound around the head cylinder over a predetermined angular distance making for an angle somewhat greater than 180° in $\Omega$-like configuration. To this end, when the magnetic tape is led out from a tape cassette with the aid of tape lead-out pins and wound around the head cylinder, the tape lead-out pins should preferably be moved along an arcuate path. In this connection, it is known that the tape lead-out pin is anchored in a rotating arm at one end thereof, which arm is mounted pivotally about a center pivot and serves to move the tape lead-out pin between the tape cassette and the head cylinder when the arm is rotated.

The above arrangement is however disadvantageous in that the rotating arm must be comparatively long since the distance between the tape cassette and the head cylinder is comparatively great. This in turn causes a correspondingly great radius of the arcuate path along which the tape lead-out pin is moved. Accordingly, attempts to install such a long rotating arm in VTR apparatus with a relatively large pivoting range has encountered difficulty in practice, since the available space within the recorder is too small to accommodate such a long arm, that is, the recorder requires various complicated mechanisms such as driving mechanisms for the rotating heads, tape drive mechanism and so forth. Further, the movement of the tape lead-out pin on the base plate of the recorder along an arcuate path of great curvature will require undesirably a recorder of relatively large overall size because the erasing head as well as the sound head have to be secured at locations outside the arcuate path of the tape lead-out pin.

Accordingly, an object of the invention is to provide a novel and improved magnetic tape recording and reproducing apparatus or video tape recorder (VTR) which avoids the drawbacks of the hitherto known apparatus.

Another object of the invention is to provide a VTR apparatus which can be implemented inexpensively in a relatively small size with a simplified structure, which nevertheless assures reliable operation.

With the above objects in view, there is provided a magnetic recording and reproducing apparatus of a rotating head type comprising a base plate, a head cylinder containing a plurality of rotating heads and supported on the base plate, a pair of guide grooves formed in the base plate each extending from a position adjacent to the head cylinder to a tape loading position, a pair of tape lead-out means each slidably engaged in the guide groove, and having a tape lead-out pin for leading-out a magnetic tape from a tape cassette loaded in the apparatus, moving means each engaged with the tape lead-out means in such a manner that the relative position of the tape lead-out means and the moving means is adjustable in the direction of width of the guide groove, the moving means serving to slidably move the tape lead-out means along the associated guide groove, whereby the magnetic tape is drawn out from the cassette by means of the tape lead-out pins when the tape lead-out means is moved along the associated guide grooves by means of the moving means and brought in close contact with the head cylinder.

Figure 2:
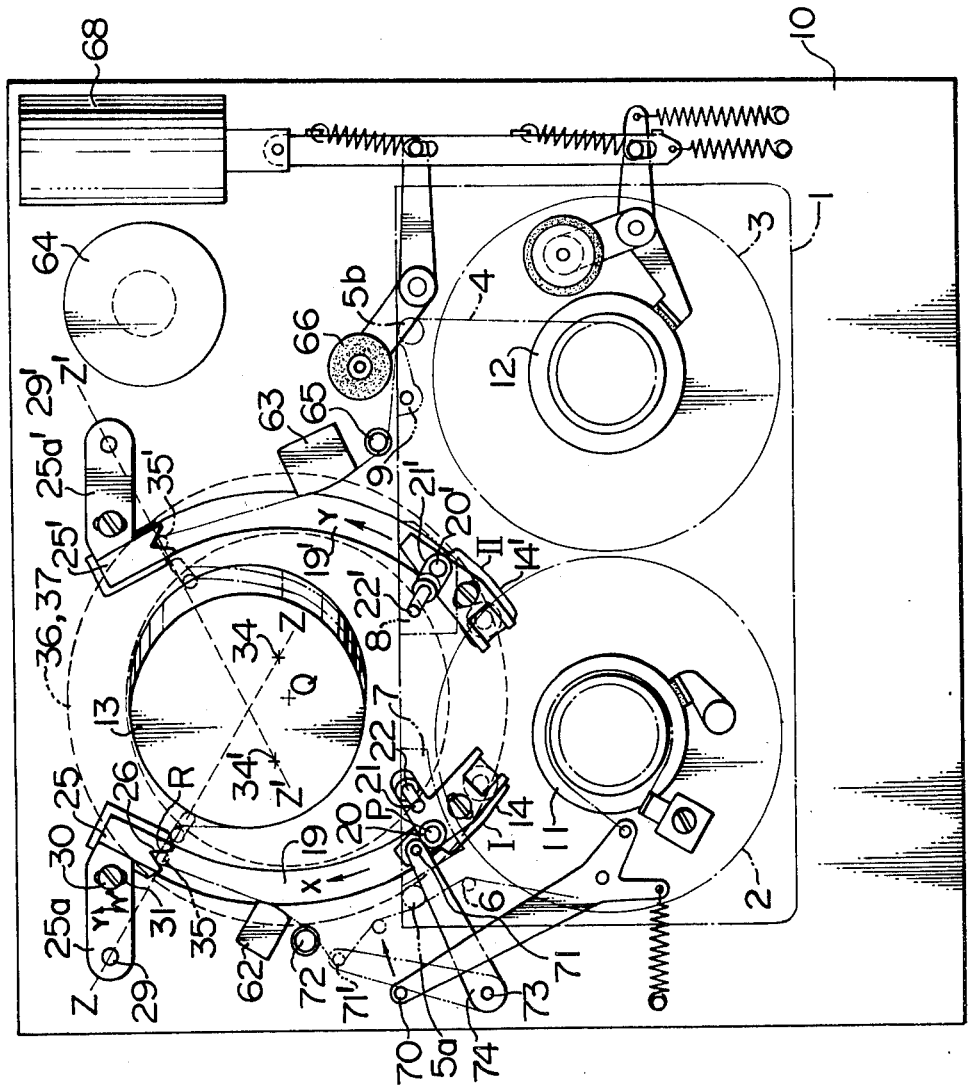
Figure 3:
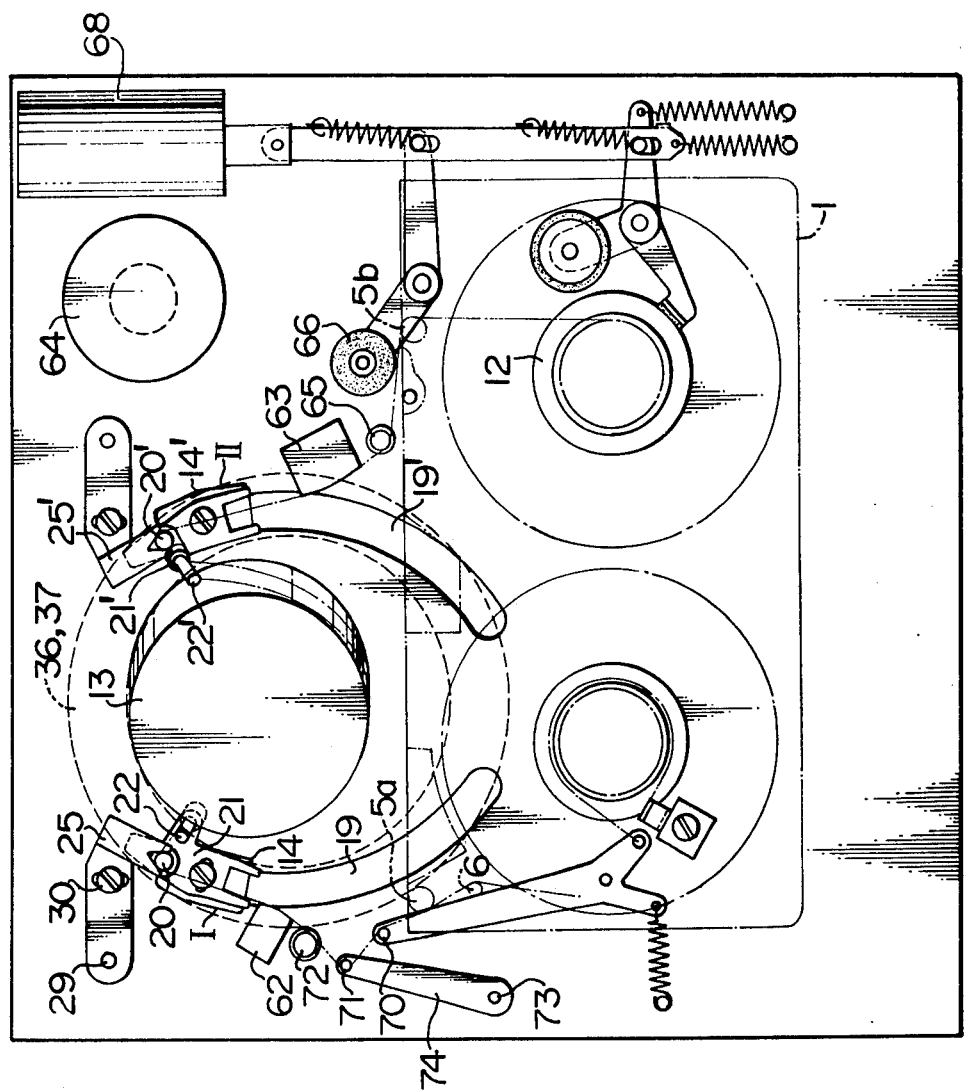
Figure 4:
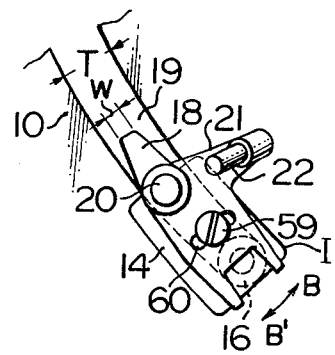
Figure 5:
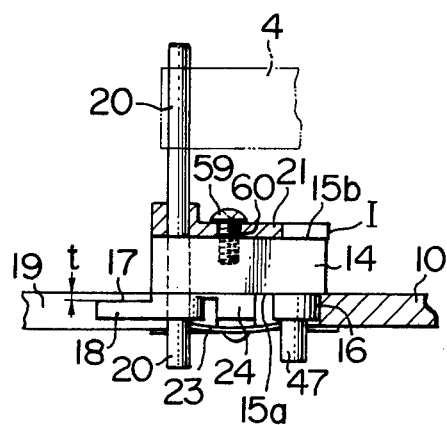
Figure 6:
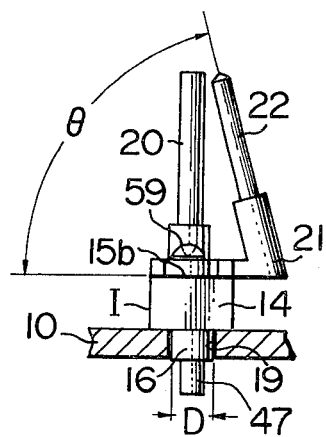
Figure 7:
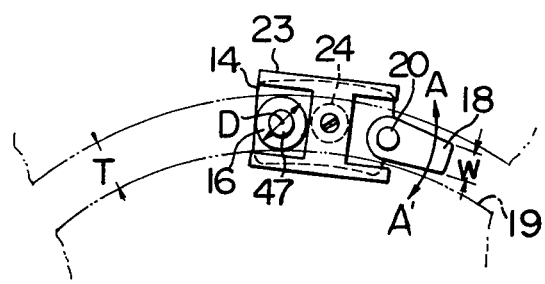
Figure 8:
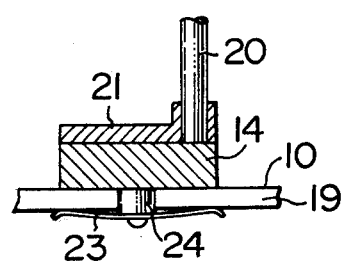
Figure 9B:
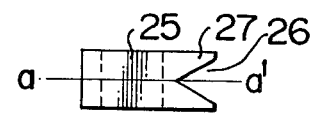
Figure 9A:
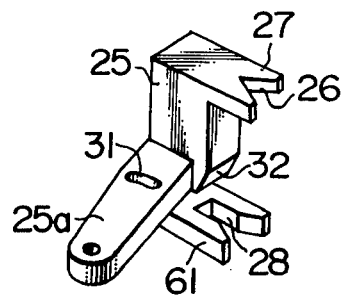
Figure 9C:
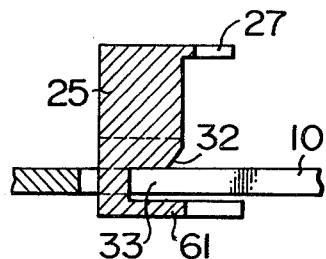
Figure 9D:
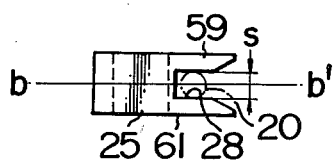
Figure 10:
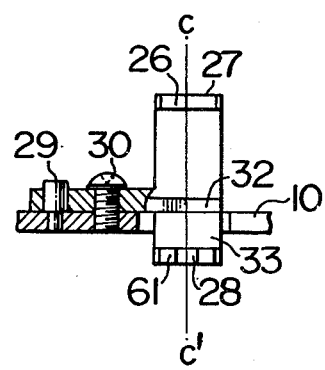
Figure 11:
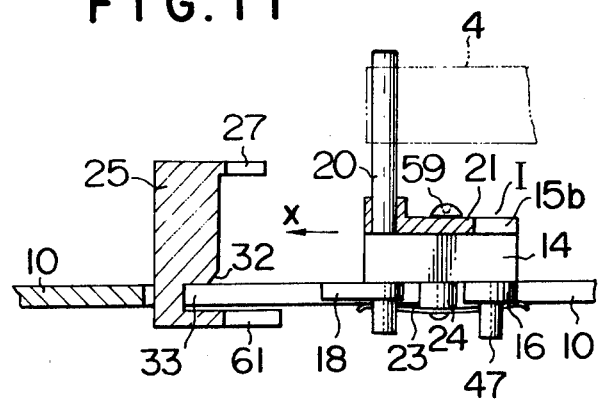
Figure 12A:
Figure 12B:
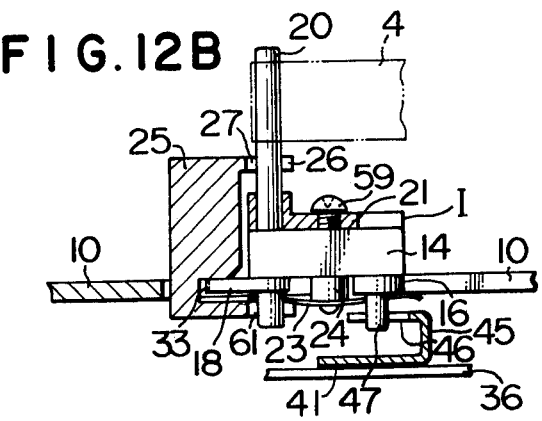
Figure 12C:
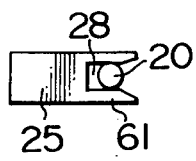

The above and other objects, features and advantages of the invention will become more apparent from the detailed description of the preferred embodiments of the invention taken in conjunction with the accompanying drawings, in which:

FIG. 1 is a perspective view showing schematically an example of a magnetic tape cassette employed in a magnetic recording and reproducing apparatus or VTR apparatus according to the present invention, FIG. 2 is a top plan view showing an embodiment of a VTR according to the invention in a state before the magnetic tape is loaded, FIG. 3 is a similar view to FIG. 2 and shows the same in a state after the tape cassette has been loaded, FIG. 4 is a bottom plan view of a tape lead-out mechanism of the VTR apparatus shown in FIGS. 1 to 3, FIG. 5 is a side view of the tape lead-out mechanism shown in FIG. 4 with a portion shown in section, FIG. 6 is a front view of the same with a portion shown in section, FIG. 7 is a top plan view of the same, FIG. 8 shows the same in a side view with the same portions shown in section, FIG. 9A is a perspective view of a stopper means employed in an embodiment of a VTR according to the present invention, FIG. 9B is a top plan view of the same with a portion broken away, FIG. 9C is a side view of the same with some portions shown in section, FIG. 9D is a bottom plan view of the same with some parts omitted, FIG. 10 shows the stopper means in a state mounted on a base plate of the VTR in a front view with some portions broken away, FIG. 11 is a partial sectional side view of the tape lead-out mechanism and the stopper means to illustrate relations existing therebetween, FIG. 12A is a top plan view showing schematically the tape leading-out mechanism and the stopper means in the state in which both are engaged with each other, FIG. 12B is a partial sectioned side view of the same, FIG. 12C is a schematic bottom plan view of the same, FIG. 13 is a plan view showing a main portion of VTR in accordance with an embodiment of the present invention, FIG. 14 is a partially sectioned side view of the same, and FIG. 15 is a fragmental side view showing a portion of the structure shown in FIG. 13.

Referring to FIGS. 1 and 2 which show a tape cassette to be employed in a magnetic recording and reproducing apparatus such as a video tape recorder (VTR), a tape cassette body 1 accommodating therein a tape supply reel 2 and a winding reel 3 on which is loaded a magnetic tape 4 extending around in tension guide posts 6, 5a and 5b. The tape 4 is partially exposed to the exterior through an opening window portion formed in the cassette body in one lateral side thereof.

There are formed in the window or open portion notches 7 and 8 for accommodating therein tape lead-out pins or the like and concave notch 9 for receiving therein a capstan. The notches 7, 8 and 9 will be described hereafter in greater detail. The magnetic tape 4 extends transversely across these notches 7, 8 and 9 under tension. When the tape cassette is not used, the window or opening portion is covered by a cover member 1a which is pivotally mounted on the cassette body 1 so as to expose partially the magnetic tape 4 when the cassette is loaded in the video tape recorder (VTR) in a manner such as shown in FIG. 1.

Referring to FIG. 2 which shows a video tape recorder (VTR) according to the present invention in a top plan view with the top cover removed, the aforementioned cassette body 1 is loaded on a base plate 10 in a predetermined position with the supply reel 2 fitted on a supply reel supporting member 11 and the winding-on reel 3 fitted on an associated supporting member 12. Reference numeral 62 denotes an erase head; 63, a head for a control signal and an audio signal; 64, an electric motor for a capstan 65; and 66, a pinch roller. Numerals I and II denote generally a pair of magnetic tape lead-out mechanisms or assemblies for leading out the magnetic tape 4 from a cassette 1 and for winding it around a head cylinder 13 which is mounted on the supporting base plate 10 in an inclined position.

The construction of the tape lead-out mechanism I will be described in detail with reference to FIGS. 4, 5, 6, 7 and 8. Reference numeral 14 denotes a base portion of the tape lead-out assembly, which base has two smooth faces 15a and 15b in parallel with each other. On the smooth surface 15a there is provided a hub 16 having a diameter D and a pin 47. Mounted on the smooth surface 15a of the base portion 14 at one end thereof is a projecting piece 18 having a flat face 17 substantially flush with the plane of the flat surface 15a. The flat face 17 may be lower than the flat surface 15a at a distance as indicated by t in FIG. 5. In the illustrated embodiment, the tolerance t is in the range of 0.02 to 0.05 mm and may vary depending upon the precision required in a practical apparatus. The width W of the projecting piece 18 is selected to be narrower than the width T of a guide groove 19 provided in the base plate 10. In the case of the embodiment illustrated in FIG. 2, the guide groove is of arcuate shape having a predetermined radius. It is, however, noted that the configuration of the guide groove is not restricted to such arcuate shape but may be of a segment in a parabolic shape or any other shape so that the groove 19 extends from the notched portion 7 of the loaded tape cassette 1 and passes by a side portion of the head cylinder 13. The width T of the groove is selected substantially equal to the diameter D of the hub 16 so that the latter is slidably engaged in the former, as shown in FIG. 6. In this manner, the base portion 14 of the lead-out assembly can be slidably guided on the base plate 10 along the guide groove 19. Further, because the width W of the projecting piece 18 is smaller than the width T of the guide groove 19 while the latter is substantially equal to the diameter D of the hub, the base portion 14 can be pivoted to some degree about the hub 16 in the direction indicated by arrow A—A', as is shown in FIG. 7. A vertical pin 20 is anchored in the base portion 14 perpendicular to the flat and smooth face 15a and projects for a short distance from the face 15a and for a longer distance from the flat surface 15b. The vertical pin 20 is adapted to engage with the magnetic tape 4 in the cassette 1, and after the tape has been led out of the cassette, the pin 20 functions as a guide pin for defining the running path of the tape 4. Reference numeral 21 denotes the fitting portion of a correcting post 22 inclined at a predetermined angle $\theta$ relative to the flat surface 15b. The fitting portion is fixedly secured to the flat or smooth face 15b of the base portion 14 by means of a screw 59 so that the axis of the post 22 intersects that of the vertical pin 20. The screw 59 is aperture received in a mounting aperture slot 60 which is elongated in the transverse direction of the guide groove 19, as can be seen from FIG. 4. With such arrangement, when the screw 59 is loosened, it is possible to make the fitting portion 21 of the correcting post 22 pivot around the vertical pin within a limited angular distance in the direction indicated by arrows B—B', thereby allowing a fine adjustment for positioning the correcting post 22.

A leaf spring 23 having a forked end portion is mounted on a seat 24 provided on the flat surface 15a of the base portion 14 in the manner shown in FIGS. 5, 7 and 8, and causes the smooth face 15a of the base portion 14 against abut to the top surface of the base plate 10 under resilient pressure and to prevent the base portion 14 from being disengaged from the guide groove 19.

In the foregoing, the construction of the tape lead-out mechanism I has been described. It should be noted that the tape lead-out mechanism II has the same structure as the mechanism I except that the geometrical arrangement of the components and parts constituting the tape lead-out mechanism II is symmetrical to that of the above described mechanism I with respect to a center line extending therebetween, as can be seen in FIG. 2, and that a correcting post 22' is inclined outwardly from a vertical pin 20'. In other points the structure of the tape lead-out mechanism or assembly II is substantially same as that of the mechanism I and therefore a detailed description thereof will be eliminated. For a better understanding of the mechanism II, like reference numerals each with a prime designate corresponding components or parts to that in the mechanism I.

The position of the tape lead-out mechanisms I and II after the magnetic tape 4 has been pulled out of the cassette 1 are limited by associated stoppers 25 and 25'. Since these stoppers 25 and 25' are also of the same structure except for the symmetrical arrangement thereof, a detailed description will be provided only for the stopper 25 by referring to FIGS. 2, 9A to 9D, and 10.

As can be seen from these drawings, the stopper 25 is composed of a pair of forwardly projecting plates 27 and 61 disposed in parallel and in opposition to each other. The upper projecting plate 27 is formed with a V-like notch 26, while the lower projecting plate 61 is formed with a U-like notch 28. The disposition of these plates 27 and 61 is made in such way that the axial line c—c' crossing through the center lines a—a' and b—b' of the V- and U-like notches 26 and 28 extends perpendicular to the upper surface of the base plate 10, refer to FIGS. 9B, 9D and 10. The width S of the U-like notch 28 is substantially equal to the diameter of the vertical pin 20 previously described herein so that the pin 20 may be received in the U-like notch 28, as indicated by the broken line in FIG. 9D. The stopper 25 is mounted on the base plate 10 through a mounting arm 25a so as to be pivotal around a stud 29 and is adapted to be fixedly secured at predetermined position by a screw 30 through an elongated slot 31 formed in the arm plate 25a. The stopper 25 mounted on the base plate 10 may be pivoted about the stud 29 to some degree in the direction Y—Y' (FIG. 2). The stopper 25 has an inclined guide surface 32 which serves as a guide for guiding the projecting piece 18 formed in the base portion 14 of the tape lead-out mechanism I into a position where the projecting piece 18 is engaged in a recess 33 formed in the stopper 25 when the base portion has moved in the direction denoted by X during the tape lead-out operation thereof, as is shown in FIG. 11. Since the structure of the stopper 25' is symmetrical to the stopper 25, further description of the stopper 25' will be eliminated. The components of the stopper 25' corresponding to those of stopper 25 are denoted by like reference numerals each attached to a prime. In this connection, it is to be noted that the guide grooves 19 and 19' of the tape lead-out assemblies I and II have, respectively, a predetermined curvature having center points 34 and 34', and that the studs 29, 29' for pivotably attaching the mounting arms 25a, 25a' of the stoppers 25, 25' are respectively positioned on a line z—z and z'—z' passing through each of the above mentioned respective center points 34, 34' and the center positions 35, 35' of the tape lead-out pins 20, 20' when they are stationarily engaged in the V-like notchs 26, 26' of the stoppers 25, 25'. In practice, it is required to adjust the positions of the stoppers 25 and 25' to some degree in either direction when the running path of the magnetic tape 4 and particularly, the envelope thereof are to be adjusted. To the end, the centers of the V-like notches 26 and 26' may ideally be adjusted in their positions along curvatures of the grooves 19 and 19' during adjustment of the stoppers 25 and 25'. However, such procedure is not suited for mass production of the apparatus. Alternatively, the stoppers 25 and 25' may be pivotably adjustable about the mounting studs 29 and 29' so as to give substantially the same effect as if they were displaced along the curvature of the guide grooves 19 and 19'. The degree of adjustment is within an extremely limited rotation range, since, in practice, the adjustable range of the stopper 25 or 25' about the stud 29 or 29' is on the order of 1 mm.

Referring to FIGS. 13 and 14 in combination with FIG. 2, reference numerals 37 and 36 indicate rotatable tape loading rings or disks coaxially disposed together in a superposed relation below the base plate 10 by means of associated rollers 38a, 38b, 38c, 38d, 38e, and 38f. Each of the loading rings 37 and 36 is formed with gear teeth 39 and 40 in the peripheral portions thereof over predetermined angular ranges of β and γ, respectively. The loading ring 36 is provided with a slide member 41 which is slidably moved in the longitudinal direction as guided by guides pins 42 and 42' anchored on the ring 36 and received in engaging slots 44 and 44', respectively, which slots 44 and 44' are formed in the slide member 41. The member 41 is usually biased in the direction indicated by arrow M by means of a tension spring 43 connected to one end thereof. At the other end, the side member 41 is provided with a bent portion 45 which is formed with an elongated slot 46 of a sufficiently large width to allow a slidable engagement with the pin 47 provided in the hub portion 16 of the tape lead-out assembly I. The elongated slot 46 is required to compensate for the difference between the rotating path of the loading ring 36 and the sliding path of the tape lead-out mechanism I. In this connection, it will be appreciated that the slot 46 and the guide pin 47 may be provided in the reversed relation, i.e. the former may be formed in the loading ring 36, while the latter may be mounted on the slide member 41.

In a similar manner, the loading ring 37 is provided with a slide member 48 adapted to be guided by means of pins 49 and 49' received in associated slots and urged in the direction N by means of a tension spring 50. As in the case of the slide member 41, the member 48 is provided with a bent portion 51 which is formed with an elongated slot 52 having a sufficiently large width to allow slidable engagement with the pin 47' provided in the hub portion 16' of the tape lead-out mechanism II.

Reference numeral 53 denotes a spur gear meshed with the toothed peripheral portion 39 of the loading ring or disk 37. Another spur gear 54 is engaged with both the spur gear 53 and the toothed peripheral portion 40 of the loading ring or disk, and adapted to be rotated by a loading motor (not shown) by way of a worm 55 and a worm gear 56 shown in FIG. 15. In more detail the arrangement is such that the loading rings or disks 36 and 37 are rotated in opposite directions upon rotation of the loading motor in either direction. Referring to FIG. 13, a limit switch 57 is provided for terminating the loading operation. In more detail, the switch 57 is adapted to engage with a cam portion 58 formed in the loading ring 36 at the end of the rotation of the loading rings 36 and 37 over respective predetermined angular ranges, thereby interrupting a power supply to the loading motor and stopping rotation of the loading rings 36 and 37.

The tape loading operation of the above described apparatus will now be described. When a tape cassette such as shown in FIG. 1 is loaded into a video tape recorder (VTR) having the above mentioned structure, the cassette is lowered into the body of the recorder by means of an elevation mechanism, which itself is known to those skilled in the art, to such a position that the vertical pins 20 and 20', as well as correcting posts 22 and 22' may be received in the notched recesses 7 and 8 formed in the tape cassette body 1. The capstan 65 is received in the notched recess 9. Refer to FIG. 2. In this manner, the tape lead out mechanisms I and II come to positions in which they engage with each of the loading rings 36 and 37, as shown in FIG. 2. The rotation angle α of the loading rings 36 and 37, which angle is attained when the cam portion 58 has come to the position to actuate the limit switch, is selected to be greater than an angle < PQR, where P is the geometrical center point of the vertical pin 20 or 20' located in the notched recesses 7 and 8 formed in the tape cassette, as is shown by a solid line in FIG. 2, Q is the common center of the rotation of the loading rings 36 and 37, and R is the geometrical center position of the upstanding pin 20 or 20' stationarily engaged in the V-like recesses 26 or 26' of the stopper 25 or 25' which are represented by broken lines 35 and 35' in FIG. 2.

In the reproduction mode, when an associated push button (not shown) is pressed down, the loading motor is energized to start the rotation of the loading rings 36 and 37 in the clockwise and counter-clockwise directions, respectively, as the result of which the tape lead-out mechanism I is slidably moved along the guide groove 19 in the direction X, while the tape lead-out mechanism II is guided by the groove 19' in the direction Y. In the meantime, the magnetic tape 4 is drawn out from the cassette 1 by means of the vertical lead-out pins 20 and 20' as well as the correcting posts 22 and 22' and make contact with to the peripheral surface of the head cylinder 13. When the tape lead-out pins have attained to the position where they are engaged in the V-like notches 26 and 26' as well as the U-like notches 28 and 28' of the associated stoppers 25 and 25', as shown in FIG. 3, the accompanied rotational movements of the sliding members 41 and 48 mounted on the loading rings 36 and 37, respectively, are stopped, and thereafter only the loading rings 36 and 37 are permitted to rotate until the cam 58 actuates the limit switch 57 thereby terminating the lead-out operation. During this phase of operation, the tension springs 43 and 50 are resiliently expanded as the loading rings 36 and 37 are rotated, whereby the restoring forces of the thus distorted springs 43 and 50 will press the vertical pins 20 and 20' against the V-like grooves 26 and 26' of the stoppers through the slide members 41 and 48. In this manner, the vertical pins 20 and 20' are securely held against the V-like grooves 26 and 26' of the stoppers 25 and 25' under the resilient forces of the tension springs 43 and 50. In this state, the loading motor is deenergized and the loading rings 36 and 37 will stop at the attained positions without being returned to the original position, because of the provision of the worm 55 and worm gear 56 meshed with each other. Subsequently, a plunger 68 is actuated to press an idler roll 66 to the capstan 65 thereby causing the magnetic tape 4 to run for the reproduction operation.

It should be mentioned here that the head cylinder 13 is inclined relative to a vertical line perpendicular to the plane of the base plate 10 at an angle equal to the angle of the correcting posts 22 and 22' inclined relative to the same vertical line so that the magnetic tape 4 supplied from the source reel 2 and wound around the winding reel 4 is perfectly contacted closely with the peripheral surface of the rotating head cylinder. As will be seen from FIG. 3, when the loading of the magnetic tape 4 has been completed, the magnetic tape 4 runs from the supply reel 2 to the winding reel 3 by way of the guide posts 6 and 5a, a tape tensioning pin 70, an auxiliary lead-out pin 71, a stationary pin 72, the erasing head 62, the vertical pin 20, the correcting post 22, the rotating head cylinder 13, the correcting post 22', the other vertical pin 20', the head 63 for control and audio signals, the capstan 65 and the guide post 5b. The tape is eventually wound on the winding reel 3.

When the magnetic tape 4 is led out from the cassette 1, the vertical pins 20 and 20' as well as the correcting pins 22 and 22' will serve as the guide pins for guiding the tape 4 from the cassette 1 and then serve as the positioning pins for ensuring that the magnetic tape 4 makes snug contact with the peripheral surface of the head cylinder 13, when the pins are pressed against the stoppers 25 and 25'. Since these pins 20, 20' and posts 22, 22' of the tape lead-out mechanisms I and II are driven by the annular loading rings 36 and 37 to lead out the magnetic tape 4, it will be appreciated that the curvature of the moving path which corresponds to that of guide groove 19 or 19', for the magnetic tape lead-out mechanisms I or II is not required to coincide with the curvature of the loading ring 36 or 37 due to the elongated slots 46, 62 provided in the bent portions 45, 51. Thus, according to the teaching of the present invention, a ring of a small diameter can be employed for the loading rings 36 and 37. Additionally, when it is compared with the hitherto known arrangement in which the tape lead-out assemblies I and II are rotated by means of rotating arms, the use of the loading rings as in the case of the illustrated embodiment of the present invention allows other mechanisms required in the recorder to be installed in the space available at the center portion of the loading rings, which advantageously leads to a miniaturization of the overall size or dimension of the recorder. Furthermore, the arrangement is that the pair of loading rings 36 and 37 are driven by a single loading motor through a pair of meshed spur gears 53 and 54, and thus, the paired loading rings 36 and 37 can be rotated at an equal speed in the opposite directions with a simplified driving structure.

Referring to FIG. 2, the auxiliary tape leading-out pin 71 is anchored to a rotatable arm 74 which is adapted to be smug about a stud 73 through a suitable driving means (not shown). Upon inserting the tape cassette 1, the pin 71 is positioned at the notched recess 7 of the cassette 1 and adapted to be rotated for a predetermined angular distance during the tape loading operation (FIG. 2) thereby to provide an aid for closely contacting the magnetic tape 4 to the erasing head 62.

The tension pin 70 is mounted on a tension arm 76 pivoted about a stud 75. Before the magnetic tape has been completely loaded, the arm 76 is enforcedly held in a position in which the tension pin 70 is not yet in contact with the magnetic tape 4, as is shown by a solid line in FIG. 2. After the completed tape loading operation, the arm 76 is released from the above restrained state. Then, the tension pin 70 will bear on the led-out tape 4 to serve thereafter as the tension pin.

Next, referring to FIGS. 12A, 12B and 12C, the manner in which the magnetic tape lead-out mechanism I is positively brought into engagement with the stopper 25 will be described. As will be appreciated from the foregoing description, the tape lead-out mechanism I, is moved with the rotation of the loading ring 36 while the hub portion 16 slides in the guide groove 19 without chattering. Accordingly, the tape lead out mechanism I will approach the stopper 25 as guided by the groove 19 and the vertical pin 20 will at first engage in the V-like notch 26 of the projection 27. At that time, the pin 20 will not undergo any lateral movements and be positively positioned at the center of the V-like notch since the vertical pin 20 has been stationarily positioned in the V-like notch 26. In such condition, any further force which causes the mechanism I to move upwardly can be supressed by projection 18 of the tape leading-out mechanism which will bear against the upper surface of the concaved recess 33 formed in the stopper 25 so as to be held at this position. The lower portion of the vertical pin 20 is then prevented from being moved laterally as it is snugly fitted in the U-like groove 28 formed in the lower projection 61. In this manner, the vertical tape lead-out pin 20 is restricted at the end position of the guide groove 19 against movement in any direction by means of the cooperating V-like groove 26, U-like groove 28 and upper surface of the concaved portion 33, whereby the pin 20 is positioned correctly and precisely perpendicular to the plane of the base plate 10. Thus, in either operation of the recorder in the reproducing or the recording mode, the magnetic tape 4 is accurately placed in contact with the peripheral surface of the rotating head cylinder 13 by means of the vertical tape lead-out pin 20. The same will of course apply to the function of the other pin 20'.

When a button (not shown) for stopping the operation of the recorder is depressed, the tape unloading condition is set up, whereby the pins 20 and 20' are returned to and restored in the original positions.

We claim:

1. A magnetic tape recording and reproducing apparatus of the rotary head type, in which a magnetic tape cassette containing a magnetic tape is loaded, comprising:
   a base plate;
   a head cylinder mounted on said base plate and having a rotary head, a pair of guide grooves being provided in said base plate on either side of said head cylinder and extending between a first position adjacent said head cylinder and a second position adjacent a magnetic tape cassette loaded in said apparatus;
   a movable base slidably engaged within each of said guide grooves, said movable base having a vertical pin affixed thereto;
   a pair of loading rings provided below said base plate;
   driving means for rotating each said loading ring; and
   means for connecting each said movable base to one of said loading rings so that said movable base integrally moves with each said loading ring along a different one of said guide grooves, said means being further adapted to slidably move each said base in the direction of width of said guide grooves in relation to said loading ring, each said movable base being freely movable along said guide groove between the first and second positions when said loading ring is operated through said driving means.

2. An apparatus as set forth in claim 1, wherein each of said guide groove has a curvature which is different from that of the locus described by said connecting means with said loading ring being rotated through said driving means.

3. An apparatus as set forth in claim 1, wherein said connecting means includes a slidable member resiliently engaged with said loading ring, said slidable member being coupled to said movable base, said movable bases thereby resiliently bearing against stopper means located in said first position.

4. An apparatus as set forth in claim 3, wherein said slide member is provided with a bent portion having an elongated slot for slidable engagement with a pin provided on said movable base.

5. An apparatus as set forth in claim 3, wherein said slidable member includes a bent portion having a pin for slidable engagement in an elongated slot provided in said movable base.

* * * * *